United States Patent Office 3,198,867
Patented Aug. 3, 1965

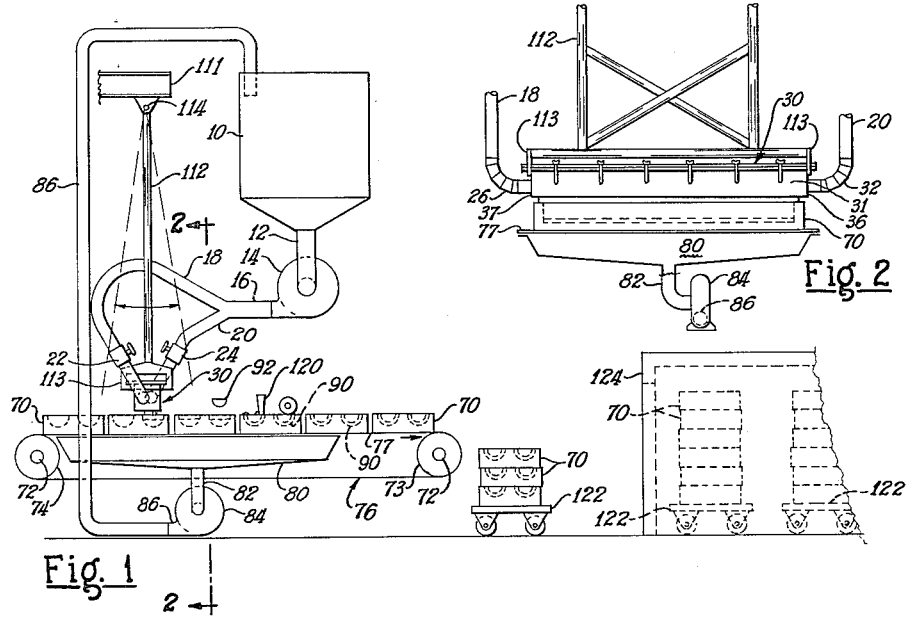

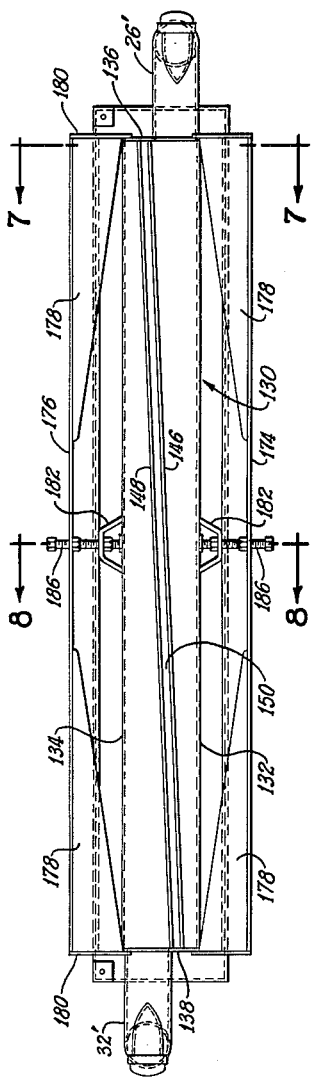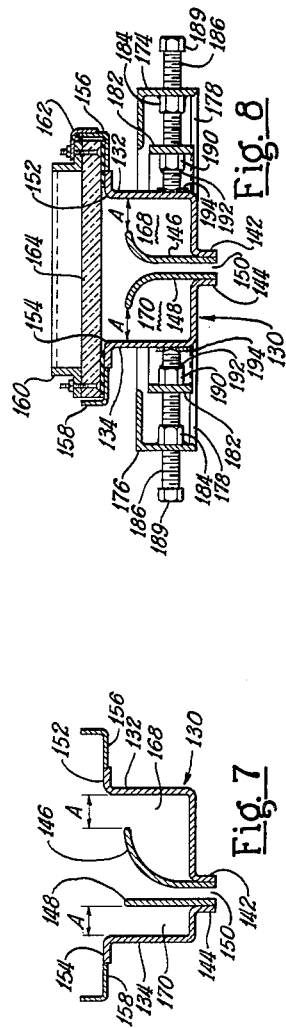
INVENTORS
EDWARD G. SIGGERS &
BY ARTHUR D. DENNY
ATTORNEYS

3,198,867
METHOD FOR PROCESSING SLURRY
Edward G. Siggers, Granville, Ohio, and Arthur D. Denny, Erlton, N.J., assignors to Owens-Corning Fiberglas Corporation, Toledo, Ohio, a corporation of Delaware
Filed Dec. 13, 1960, Ser. No. 75,588
4 Claims. (Cl. 264—299)

This invention relates to method for processing slurries and more especially to a method for distributing or dispersing slurry into molds or matrices in a manner whereby substantially air is excluded to eliminate the presence of voids or pockets in the end product.

High temperature resistant insulation has been produced by treating reactive mixtures of finely divided solids and liquids to effect chemical reaction and integration of the same in the production of dried and indurated ware as solid products. The processing generally comprises the preparation of a slurry of finely divided solid ingredients in a liquid medium, such as water, thoroughly mixed to form a comparatively thick wet mixture but of sufficiently flowable consistency enabling it to be delivered, under pressure, into a mold, the water or liquid also serving as a chemically reactive agent to promote both chemical reactions and changes in physical state between the reactive components of the slurry or mass.

It is conventional practice to subject the molded or shaped mass to heat and pressure in an autoclave in a vapor phase to dry and harden or indurate the product under controlled conditions. It is a practice to place the molded product as a wet mass in an autoclave surrounded by a gaseous phase of vapors corresponding to the liquid contained in the product at an appropriate temperature to permit the chemical reactions and changes in the physical state under pressures sufficient to control the mass throughout the treatment. A typical slurry for producing such an end product comprises basic ingredients such as a mixture of hydrous calcium silicates and asbestos fibers and other minor ingredients for imparting particular characteristics to the end product. A method of this character is described in United States Patent 2,534,303 to N. S. Serinis.

The present invention embraces an improved method for distributing or delivering slurry of the above-mentioned general character into molds or matrices for producing molded ware which may be processed in the manner above-mentioned.

An object of the invention resides in a method of feeding slurry, under pressurizing conditions, into a distributor or chamber from which the material is delivered into a mold or matrix in a manner whereby air is substantially excluded from the slurry in the distributor and the distributed slurry rendered substantially free of interstitial air.

Another object of the invention resides in a method of delivering and distributing slurry into a matrix at an increased speed whereby to exclude interstitial air so that the slurry is dispersed in the matrix as a substantially integrated body.

Another object of the invention resides in the method of delivering or distributing slurry, under pressure, into a matrix of a character for producing flatware whereby the slurry distributor moves across the matrix at a velocity approximately equal to or greater than the velocity of delivery of the stream of slurry whereby the slurry is deposited in laps or folds in the matrix without appreciable agitation and thus avoiding tendency for the slurry to agglomerate whereby the fibers in slurry tend to be oriented generally parallel to the major surface of the flatware formed in the matrix.

Another object of the invention resides in a method of delivering the slurry into a matrix with a minimum of agitation whereby a more uniform distribution or homogeneity of the fibers in the slurry is maintained whereby the resulting product is endowed with improved strength characteristics and insulating properties.

Further objects and advantages are within the scope of this invention such as relate to the arrrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a schematic side elevational view illustrating a form of apparatus for carrying out the method steps of the invention;

FIGURE 2 is a transverse sectional view taken substantially on the line 2—2 of FIGURE 1;

FIGURE 3 is a top plan view illustrating one form of slurry distributor of the invention;

FIGURE 4 is a plan view of a closure for the chamber of the distributor illustrated in FIGURE 3;

FIGURE 5 is a transverse sectional view taken substantially on the line 5—5 of FIGURE 3 with the cover in place on the distributor;

FIGURE 6 is a bottom plan view illustrating a modified form of slurry distributor of the invention;

FIGURE 7 is a transverse sectional view taken substantially on the line 7—7 of FIGURE 6, and FIGURE 8 is a transverse sectional view taken substantially on the line 8—8 of FIGURE 6.

While the method and apparatus of the invention are especially usable for delivering and distributing slurry of a composition for producing various shapes of bodies suitable for high temperature insulation, it is to be understood that the method and apparatus may be advantageously employed for feeding or delivering other types of slurry.

The method and apparatus of the invention has particular utility in feeding and distributing slurry to molds or matrices of various shapes and the product processed through a curing and reaction phase wherein the same is dried and indurated, under pressure, in a vapor environment providing an end product of rigid character having high thermal resistance rendering the end product particularly adaptable for use as heat insulation under high temperature conditions.

For example, a slurry of a character for forming such products comprises a base constituent of hydrous calcium silicates containing asbestos fibers and other minor ingredients for imparting particular properties, water being employed to form the slurry as well as to facilitate the chemical and physical changes occurring during the curing and indurating phases, the water being eventually evaporated and dispelled from the product during the curing phase.

Referring to the drawings in detail, and initially to the form of apparatus shown in FIGURES 1 and 2, there is illustrated an arrangement for forming or molding pipe covering units of the slurry, each section of a unit being of semiannular cross-section. The apparatus includes a receptacle or hopper 10 adapted to contain a quantity of the slurry in a comparatively thick but flowable state or condition. The outlet tube 12 of the hopper is connected with a pump 14, driven by a suitable motor (not shown) for feeding the slurry under pressure to the distributor. The pump 14 is provided wih an outlet pipe 16 having a Y-shaped fitting connected with slurry conveying tubes 18 and 20.

The tube 18 is provided with a control valve 22 and the tube 20 provided with a control valve 24. The tube 18 is connected through an elbow 26 with one end of the distributor construction 30. The tube 20 is connected through an elbow 32 with the opposite end of the distributor construction 30. In the embodiment illustrated the distributor construction 30 is inclusive of a substantially rectangular or elongated chamber provided by a receptacle 31 having substantially parallel side walls 34 and 35, end walls 36 and 37 and a bottom or floor 38.

The upper edge regions of the side and end walls are provided with outwardly extending flanges 40 and 41 and end flanges 42 and 43, the upper surfaces of the flanges being in a common plane.

The distributor chamber 31 is adapted to be closed by a cover plate 46, shown in FIGURES 4 and 5, comprising a substantially rectangularly shaped frame 47 preferably fashioned of metal which forms a means for mounting or supporting a plate 48 which may be of transparent plastic, such as Plexiglas (methyl methacrylate resin) or glass to facilitate visual inspection of the interior of the distributor, or the plate 48 may be made of other suitable rigid material.

The flange 40 is provided with a plurality of lengthwise spaced threaded studs or bolts 50. The wall 35 may be provided with brackets 52 forming pivotal supports for the eye portions of locking bolts 54 pivoted upon pins 56 carried by the brackets 52, as shown in FIGURE 5. The frame of the cover construction 46 is provided at its respective edge regions with series of slots 58 and 60 which, when the cover plate is in a position of use as shown in FIGURE 5, accommodate the securing bolts 50 and the pivotally supported locking bolts 54.

Wing nuts 62 are provided for the bolts 50 and 54 which may be drawn up to secure the cover construction in position upon the rectangular distributor housing 31. In order to remove the cover construction 46 from the distributor housing 31, the wing nuts 62 are backed off, the pivoted locking bolts 54 swung in a counterclockwise direction downwardly as viewed in FIGURE 5, and the frame 47 carrying plate 48 slidably moved away from the threaded studs 50, providing access to the interior of the housing 31. The means in the housing 31 for delivering the slurry from the distributor will be hereinafter described.

The arrangement illustrated in FIGURE 1 exemplifies the use of the method and apparatus for delivering slurry into molds or matrices formed in matrix or mold blocks 70. The arrangement includes means for conveying the matrices or blocks 70 beneath the distributor 30 so that the slurry may be delivered to the matrices successively without interruption of the flow of material from the distributor. A pair of shafts 72 support rolls 73 and 74 which provide support for an endless belt-type conveyor 76, the upper flight 77 of which is adapted to support matrices or mold blocks 70 in side-by-side relation as shown.

One of the supporting rolls for the endless belt 76 may be driven by a motor (not shown) to advance the upper flight 77 in a right-hand direction as viewed in FIGURE 1. Disposed beneath the upper flight 77 of the belt is a receptacle 80 providing a chamber for receiving excess slurry falling from the mold blocks. Connected with the chamber 80 by a pipe 82 is a pump 84 having an outlet duct or tube 86 leading into the slurry supply receptacle 10. Rotation of the pump 84 continuously returns excess slurry into the hopper 10 for redelivery to the distributor.

In the embodiment illustrated, the molds or mold blocks 70 are provided with semicylindrically shaped recesses 90 extending lengthwise of the blocks 70, the latter being arranged with their longest dimension transversely of the conveyor flight 77 and the distributor 30 likewise disposed with its lengthwise dimension transversely of the conveyor flight and generally lengthwise of the recesses 90 in the blocks 70. Each of the blocks 70 is provided with two recesses 90 and removable cores 92 are adapted to fit into the recesses providing a section of semicylindrical shape of semiannular cross-section.

Each section forms one-half of a pipe insulating unit of the slurry delivered into a recess and thereafter dried, cured and indurated. The core sections 92 are supported at their end regions by the mold blocks 70 and are preferably locked in position. It is to be understood that various mold or matrix configurations may be formed in the mold blocks 70 to be filled with slurry delivered under pressure from the distributor 30. The material may be molded in rectangular or cubical shapes to form flatwear or undulated shape or of any configuration into which slurry is deliverable from the distributor 30.

As shown in FIGURES 3 and 5, the floor 38 of the distributor chamber 31 is provided with orifice, passageway or slot means 100 through which the slurry from the interior of the chamber 31 is delivered under pressure into the configurations in the mold blocks 70. The interior of the chamber 30 is provided with means for fostering the delivery or discharge of slurry through the orifice or passage 100 so that the material flows through all regions of the orifice at a substantially uniform rate and is handled in a manner to avoid the presence of interstitial air and the formation of air pockets or voids in the slurry delivered into the configurations in the mold blocks.

As particularly shown in FIGURES 3 and 5, upwardly extending, longitudinally arranged baffles or plates 102 and 104 are disposed in the chamber 31, the lower regions defining the walls or surfaces of the passage or orifice means 100.

The plates 102 and 104 are arranged in substantial parallelism and extend diagonally or obliquely in the chamber, the plates forming weirs over which the slurry flows into the passage 100 and defining compartments or sections 106 and 108 which are in opposed relation but are of the same tapered contour or configuration.

The inlet tube 26 opens into the large end of the compartment 106 and the inlet tube 32 opens into the large end of the similarly shaped compartment 108. As shown in FIGURE 5, the baffles or plates 102 and 104 are slightly divergent in a upward direction forming a tapered slurry conveying passage 110 terminating in the passage or orifice means 100. The upper edge regions of the plates 102 and 104 are spaced the same distance from the cover plate 48 throughout their entire lengths so that the areas accommodating flow of slurry from the compartments 106 and 108 into the passage or nozzle 110 will be uniform.

The plates or baffles form dams or weirs over which the slurry flows into the passage 110. The distributor 30 is supported by suitable means. As shown schematically in FIGURE 1, there is disposed above the distributor a beam or member 111 supported by suitable means (not shown). A sling 112 having portions 113 straddling the end regions of the flanges 42 and 43 is suspended from a pivot shaft 114 carried by the beam or member 111. Through the provision of the pivotal mounting for the distributor 30, the distributor may be moved or oscillated over the molds or matrices in the blocks 70.

In the formation of the semiannular sections shown in FIGURE 1, the distributor may be maintained in a stationary position and the conveyor 76 controlled or stopped by the operator to bring the distributor nozzle 100 into registration with the matrix and the same filled with slurry without relative movement between the distributor 30 and the matrix. The pivotal support for the distributor 30 is necessary in delivering the slurry into a pan or mold for forming flatwear in order to effect deposition of the slurry in folds or layers through the oscillating or swinging movements of the distributor over the area of the pan about the axis of the pivot shaft 114.

Due to the oblique or angular positioning of the baffles or weirs 102 and 104 defining the slot or distributing passage 100, the pressures effective on the slurry in compartments 106 and 108 are substantially reciprocal throughout the length of the receptacle 31 as the cross-sectional areas of the compartments 106 and 108 at any region lengthwise of the receptacle 31 are substantially equal.

It is found that under certain conditions of operation, it may be desirable to fashion the slot at the central region of a slightly lesser width than end regions of the slot, the extent of differential or taper in the slot being in a measure dependent upon the viscosity or flowability factor of the slurry.

In the use of the slurry distributor as exemplified in the embodiment illustrated in FIGURE 1, slurry of desired consistency is contained in the receptacle or hopper 10 and is delivered under pressure through the tubes 18 and 20 by the slurry pump 14 whereby the slurry is delivered into the inlets 26 and 32 at opposite ends of the distributor receptacle 31 under substantially equal pressures.

The distributor 30 is mounted generally transversely of the direction of movement of the conveyor flight 77 whereby the matrices provided in the mold block 70 are successively moved beneath the distributor during which period the slurry is discharged substantially uniformly throughout the length of the slot, passage or nozzle 100.

The rate of feed of the slurry to the distributor chamber may be controlled by the valves 22 and 24. As the matrices are filled successively with slurry, and are advanced by the conveyor flight 77, a screed or lute 120 is drawn across the face of the mold blocks to remove the excess slurry from the upper surfaces of the mold blocks. The excess slurry passes downwardly in the spaces between adjacent mold blocks 70 into the chamber 80 from which the waste slurry is returned by way of the return tube 86 into the supply 10 by the pump 84 connected with the slurry receiving chamber 80 by a pipe 82.

The mold blocks 70, containing the slurry-filled matrices are advanced by the conveyor flight 77 and are stacked upon a dolly or carriage 122 or other suitable means for transporting the blocks 70 into a steam presetting chamber 124 where the product is given a preliminary set. The product is transferred from the chamber 124 to an autoclave (not shown) in which pressure and heat are applied in a suitable vapor phase to facilitate curing, drying and indurating the product in a manner and under operating conditions such as those described in Serinis Patent 2,534,303.

The end product so produced is preferably of a density of between seven and fourteen pounds per cubic foot and has a high insulating factor and is especially useful for heat insulating purposes under high temperature conditions. The product may be any desired shape such as the pipe covering insulation illustrated as molded in half sections in FIGURE 1, or it may be flatware or any other suitable configuration. The indurated end product has a comparatively high modulus factor especially in compression.

It is desirable to fill the mold or matrix at as high a slurry speed as practicable in order to avoid the formation of air pockets or voids in the slurry as it is deposited in the matrix. It is found that the delivery of the slurry under sufficient pressure to cause it to be delivered at a slightly faster rate than under the influence of gravity has been satisfactory. Furthermore, the delivery of the slurry under pressure at a satisfactory rate prevents or tends to prevent the slurry separating into isolated sections while moving from the nozzle or passage 100 into the matrix.

In delivering the slurry into a pan for forming flatware where the distributor is oscillated or moved over the pan to deposit the slurry in laps or layers, it is preferable that the rate of delivery of the slurry from the distributor does not exceed the speed at which the delivery nozzle is moving or oscillating over the surface of the flatware pan as it is noticed that the slurry moving at higher speeds causes the slurry in the pan or mold to roll or be agitated by the incoming slurry from the nozzle.

It is therefore desirable that the rate of travel of the distributor over the pan in the formation of flatware be equal to or slightly greater than the rate at which the slurry is deposited in the pan. A control switch is provided for the motive means for the conveyor 76 to enable the operator to start and stop the conveyor at will. Through this method the slurry is laid in a pan shaped for forming flatware without undue agitation of the slurry in the pan and reducing or eliminating the tendency for the slurry to agglomerate.

When the slurry is poured in this manner, it is believed that the asbestos fibers in the slurry tend to align themselves in general parallelism with the major surfaces of the flatware or product and, by reason of the avoidance of agitation of the slurry within the pan, a more uniform or homogeneous distribution of the asbestos fiber within the slurry is maintained. Through this method of delivery of slurry, the end product is endowed with improved strength properties and effective insulating characteristics.

FIGURES 6 through 8 illustrate a modified form of the slurry distributor or nozzle construction of the invention. In this form, the distributor is inclusive of an elongated substantially rectangular receptacle 130 provided with parallel side walls 132 and 134 and end walls 136 and 138. The receptacle is formed with an opening defined by downwardly extending flanges 142 and 144 which are diagonally or obliquely arranged with respect to the longitudinal axis of the receptacle 130.

Disposed within the chamber defined by the receptacle 130 are baffle plates or weirs 146 and 148 which are welded to the flanges 142 and 144 respectively and provide the slurry discharge nozzle, passage or orifice 150. The upper regions of the side walls 132 and 134 are formed with transversely extending flanges 152 and 154 to which are welded or otherwise secured L-shaped members 156 and 158 respectively. The cover for the distributor chamber comprises a substantially rectangular frame 160 hingedly connected to the member 156 by hinges 162 secured to mmeber 156 and the cover frame 160, as shown in FIGURE 8.

Secured to the frame is a substantially transparent cover 164 formed of Plexiglas or Lucite (methyl methacrylate resins), glass or other suitable substantially transparent material through which the movement of the slurry in the chamber may be observed by the operator. The cover construction provided by the frame 160 and the cover plate 164 may be held in closed position by suitable means (not shown) similar to the bolts 54 illustrated in FIGURE 5.

The baffle plate or weir 148 at the extreme hight-hand end as viewed in FIGURE 6 is of planar shape as shown in FIGURE 7. From this configuration at the extreme right-hand end, the weir 148 is fashioned or configurated with a progressively increasing roll or curvature in a transverse direction as shown in FIGURE 8, and, at the extreme left-hand embodies or is endowed with maximum curvature of the same curvature as the weir 146 at the extreme right-hand end of the weir 146 shown in FIGURE 7.

It should be noted that the progressive curvature of one weir is reciprocal to that of the other weir throughout the lengths of the weirs. As shown in FIGURE 8, the central regions of the weirs 146 and 148 have the same amount of curvature. The curved configuration of the weirs tends to restrict the flow of slurry and thereby effect more uniform flow of slurry through all regions of the nozzle. Furthermore, the curvature of the weirs tends to maintain the compartments 168 and 170, defined by the weirs and side walls of the receptacle 130, continuously filled with slurry.

It should also be noted that throughout the lengths of both the weirs the distances indicated at A in FIGURES 7 and 8 between the upper terminae of the weirs and the adjacent side walls 132 and 134 are substantially equal so that the slurry is forced through these regions, fostering uniform flow of slurry over the weirs thence through the discharge passage or nozzle 150. It should be noted that the upper edges or terminae of the weirs or baffles 146 and 148 are equal vertical distances from the transparent cover plate 164, another factor in promoting uniform delivery of the slurry into the passage 150 throughout its length.

Disposed in parallelism with the side walls 132 and 134 of the receptacle are members 174 and 176 of L-shaped cross-section. Gusset or reinforcing plates 178 are welded to the members 174 and 176 and to end plates 180 as shown in FIGURE 6. Welded to each of the side walls 132 and 134 are brackets 182, shown in FIGURES 6 and 8, having their end regions welded to the side walls 132 and 134.

Welded to each of the L-shaped members 174 and 176 is a nut 184 through which is threaded a bolt 186. Mounted upon each bolt and intermediate a side wall of the distributor chamber 130 and a central region of each bracket 182 is a nut or abutment 190 welded to the bolt as indicated at 192.

The end of each bolt engages the central region of a washer 194 which is welded to a side wall 132 and 134 of the receptacle or chamber. Each bolt is provided with a polygonally shaped head 189 to receive a suitable tool for rotating the bolt and thereby adjust the thrust of the bolt upon the central longitudinal region of the side walls to resist deflection of the side walls under the pressure of the slurry and prevent variations in the width of the orifice or nozzle 150 particularly at the central region as any deflection or distortion in the side walls would effect the relative relation of the weirs or baffles 146 or 148.

Furthermore, in addition to reinforcing the side walls of the distributor chamber 130, the bolts 186 may be utilized to exert pressure upon the side walls at the central regions to adjust the width of the passage or orifice 150 at the central region should such adjustment be found desirable to promote uniform distribution or flow of slurry through the passage or orifice 150. For producing or molding flatware, the threaded members 186 may be adjusted to effect a diversion of more of the slurry toward the end regions of the nozzle. The plates 178 reinforce the members 174 and 176 to provide against appreciable deflection of the members 174 and 176 when the bolts 186 are drawn to exert pressure upon the side walls 132 and 134.

The arrangement shown in FIGURE 6 is provided with inlets 26' and 32' for conveying slurry from the hopper 10, shown in FIGURE 1, into the compartments 168 and 170 in the same manner as herein described in reference to the form of the invention shown in FIGURES 2 through 5. The arrangement shown in FIGURES 6 through 8 may be supported in the same manner as shown in FIGURE 1 and hereinbefore described. While the distributor or nozzle construction may be of any desired length and the orifice width modified to vary the volume of slurry delivered through the orifice or nozzle it is found that a nozzle length of between 30 and 60 inches may be employed to advantage in forming various shapes of product of the slurry.

The pump 14 employed for developing pressure on the slurry delivered into the distributor chamber is preferably driven by a variable speed motor provided with a suitable control whereby the speed of the pump may be modified to vary the pressure on the slurry. In slurry compositions embodying a higher percentage of asbestos fiber, it is essential to increase the pressure on the slurry due to the increased friction or resistance of the fibers in moving through the conveying tubes and through the distributor chamber and nozzle construction.

In initiating the use of the distributor, it is desirable to first discharge an amount of slurry under pressure through the passage or orifice in both forms of the invention in order to eradicate air which may be trapped within the distributor chamber. When the slurry flows free of air, the nozzle may then be brought into effective use in molding operations.

The spaces between the upper edges of the baffles or weirs and the lower surface of the transparent cover member may be varied to secure most efficient delivery of the slurry. The dimensions of the spaces for efficient delivery are dependent upon the size of the mold, the rate of delivery of the slurry and the consistency or condition of mobility of the slurry. If the clearance spacing is too small and the slurry of high consistency, the high resistance retards delivery of the slurry. If the clearance spacing is too great, there may be a tendency for air to enter at the ends of the nozzle, a condition which may promote oscillation of the moving slurry resulting in a ware or product of inferior quality.

In the molding of pipe covering sections in the manner illustrated in FIGURE 1, the removable cores 92 must be securely maintained in proper position during the delivery of slurry into the mold in order to prevent their dislodgment by the pressure and velocity of the slurry in filling a mold cavity. It is to be understood that while the distributor or nozzle construction of the invention has particular utility in producing blocks or bodies of high temperature insulating material from slurry, the distributor construction may be employed to advantage in delivering other viscous slurries into molds or other receiving means.

It is apparent that, within the scope of the invention, modifications and different arrangements may be made other than as herein disclosed, and the present disclosure is illustrative merely, the invention comprehending all variations thereof.

We claim:

1. A method of delivering slurry of cementitious material from a supply into a mold including pumping slurry from a supply into an elongated unvented chamber at spaced inlets therein to fill the chamber with slurry, and extruding the slurry solely by the pumping pressure on the slurry over upwardly extending weirs in the chamber thence downwardly through a discharge passage between the weirs to deliver the slurry into a mold substantially free of interstitial air.

2. A method of delivering slurry of cementitious material from a supply into a mold including pumping slurry from a supply into an unvented distributor at spaced regions therein to fill the distributor with slurry, and extruding the slurry solely under the influence of the pumping pressure across upwardly extending spaced barriers in the distributor and downwardly through a discharge passage provided by the spaced barriers to deliver the slurry into a mold substantially free of interstitial air.

3. A method of delivering slurry of cementitious material from a supply into a mold including pumping slurry from a supply into an unvented elongated slurry distributor at spaced regions therein to substantially fill the distributor with slurry, and extruding the slurry by the pumping pressure over a weir in the distributor thence downwardly through a discharge orifice to deliver the slurry into a mold substantially free of interstitial air, and oscillating the distributor over the mold during the discharge of the slurry therefrom to fill the mold.

4. A method of handling slurry of cementitious material from a supply including pumping slurry to an unvented chamber having an elongated discharge passage defined by barriers, admitting the slurry through inlets in opposed regions of the chamber, forcing the slurry solely by the pumping pressure over the barriers in the chamber into the discharge passage to deliver the slurry from the passage free of interstitial air substantially uniformly throughout the length of the passage.

References Cited by the Examiner

UNITED STATES PATENTS

| | | | |
|---|---|---|---|
| 1,789,791 | 1/31 | Tonnessen et al. | 25—122 |
| 2,816,321 | 12/57 | Hutchcraft | 25—103 |
| 2,854,895 | 10/58 | Cirrito | 162—338 |

FOREIGN PATENTS 139,608  3/53  Sweden.

ROBERT F. WHITE, *Primary Examiner.*

MICHAEL V. BRINDISI, ALEXANDER H. BRODMERKEL, *Examiners.*